(No Model.)
G. W. FOULGER.
FARM AND YARD GATE.
No. 253,487. Patented Feb. 7, 1882.
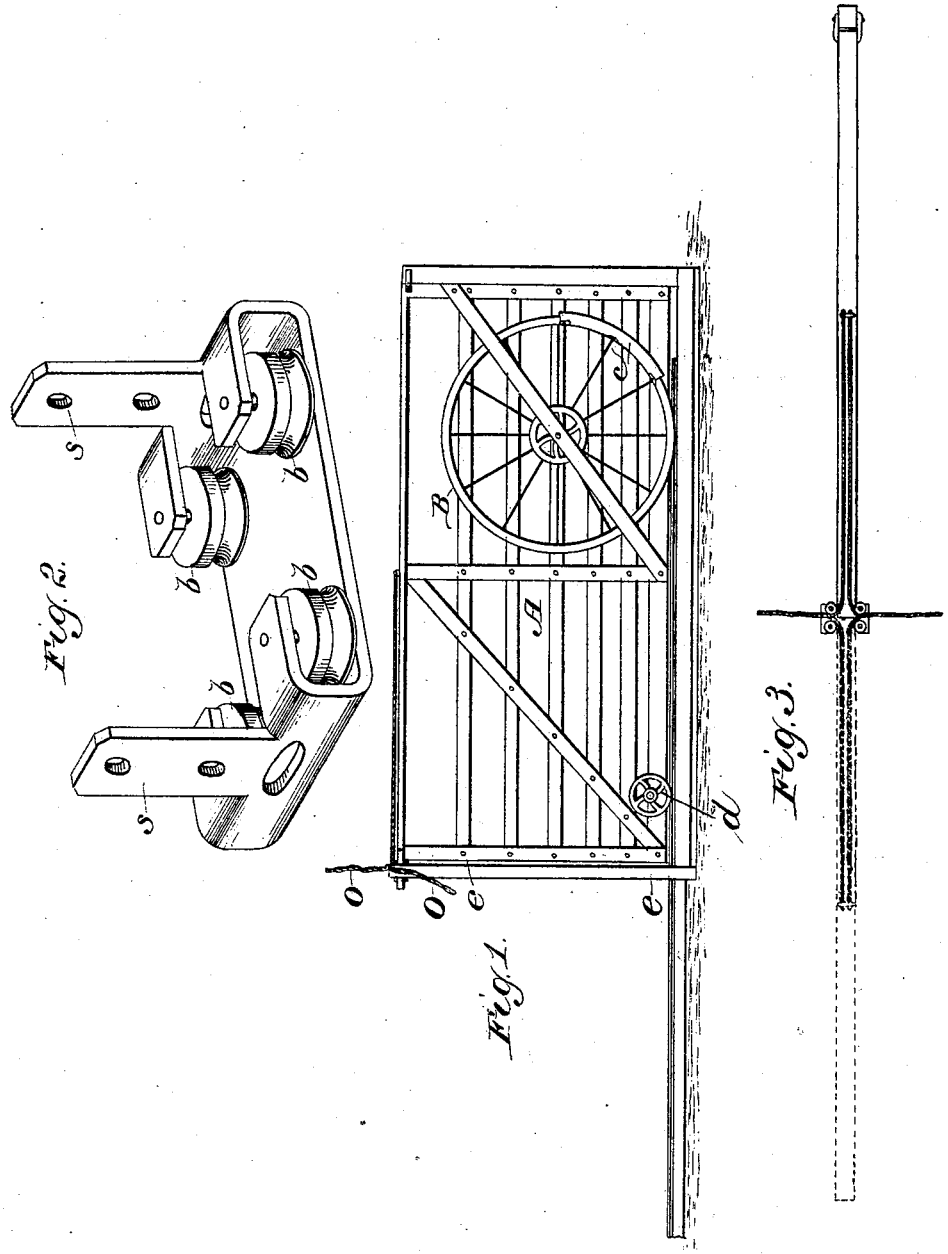

UNITED STATES PATENT OFFICE.

GEORGE W. FOULGER, OF NEWMAN, ILLINOIS, ASSIGNOR OF ONE-HALF TO WILLIAM J. HUFFMAN, OF SAME PLACE.

FARM AND YARD GATE.

SPECIFICATION forming part of Letters Patent No. 253,487, dated February 7, 1882.

Application filed November 23, 1881. (No model.)

*To all whom it may concern:*

Be it known that I, GEORGE W. FOULGER, a citizen of the United States, residing at Newman, in the county of Douglas and State of Illinois, have invented certain new and useful Improvements in Farm and Yard Gates, of which the following is a specification.

My invention relates to improvements in farm and yard gates; and the objects of my improvements are to provide a gate that can be easily opened or shut without the operator having to dismount from a wagon or other vehicle. I accomplish this by the mechanism illustrated in the accompanying drawings, in which—

Figure 1 is a view of the principal part of the gate; Fig. 2, an inverted view of a yoke and combination of pulleys which attach to the top of the posts between which the gate passes in opening and closing. Fig. 3 is a top view of the top bar of the gate, showing the position of the ropes when the gate is closed or open; also showing the pulleys as opposed to the edges of the top bar, the top part of the yoke in which the pulleys are set being removed.

Similar letters refer to similar parts throughout the several views.

The gate A is provided with a wheel, B, and another, $d$, the wheels supporting the weight of the gate and traveling on a suitable track, $i$, which track extends back between two posts, $e\ e$. The wheel B is provided with a weight, $c$, in part of its rim, and has a circumference equal to or greater than the length of the gate. Now, when the weight $c$ in the rim of the wheel B is down and the gate is moved backward or forward until the weight in the rim passes over the center of gravitation by the action of said weight, the gate will be carried one-half its length. The gate is operated by means of two ropes, $o\ o$, one end of each rope being fastened to a ring near the middle of the top bar of the gate, the other ends of the ropes reaching back to the rear posts and passing out, one on either side, between a pair of pulleys, the lower faces of which oppose the edges of the top bar of the gate, said ropes extending to a pulley made fast to a piece of timber reaching out from the top of a pole set in the ground to a point just over the driver's head while passing through the gateway with a wagon or other vehicle.

In Fig. 2 the arms of the yoke $s\ s$ reach down from the top of the posts $e\ e$, and are bolted fast to the posts, thus yoking the posts together at the top and presenting the pulleys $f f f f$, or the lower part of their faces, to the edges of the top bar of the gate. These pulleys $f f f f$ act as anti-friction rollers, so that the reciprocation of the gate may be accompanied with as little friction as possible, and also assist in directing the gate in a straight line when in motion, and they further facilitate the action of the ropes in opening and closing the gate.

Now, what I claim as my invention, and desire to secure by Letters Patent, is—

A sliding gate provided with a wheel, as shown, the circumference of which is equal to or greater than the length of the gate, part of the rim of said wheel being weighted, substantially as described.

G. W. FOULGER.

Attest:
C. V. WALLS,
H. BANE.